UNITED STATES PATENT OFFICE.

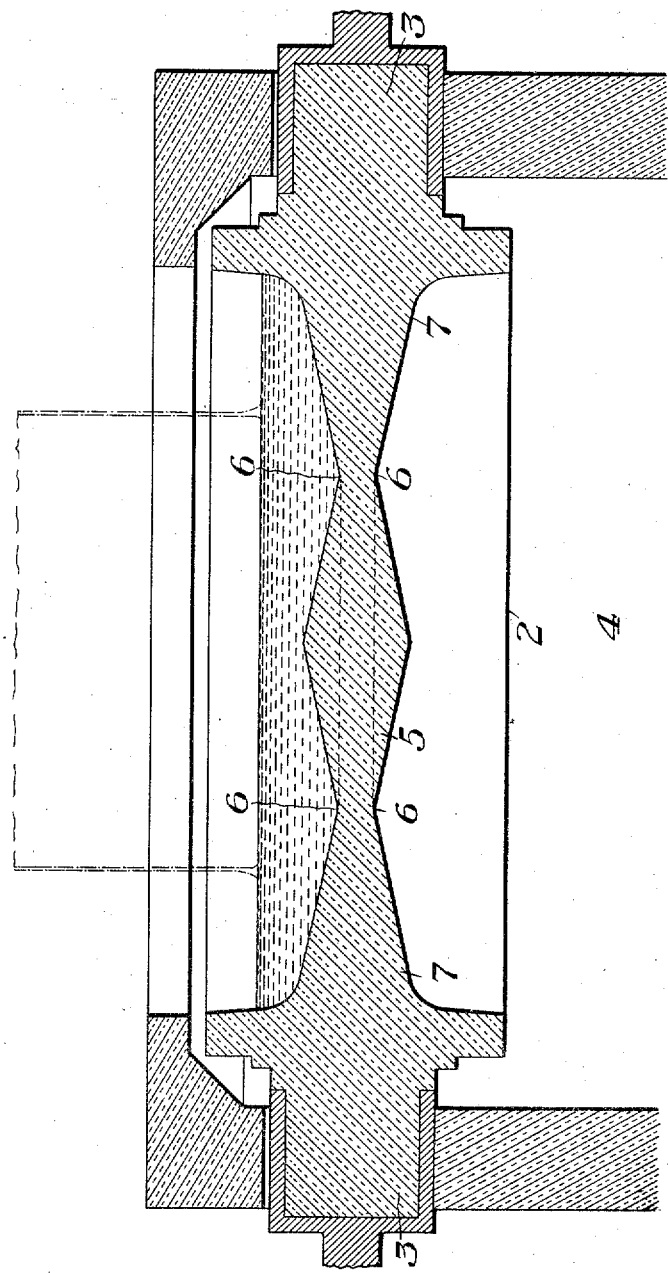

JOHN A. SWEET, OF NEW KENSINGTON, PENNSYLVANIA, ASSIGNOR TO WINDOW GLASS MACHINE COMPANY, OF PITTSBURGH, PENNSYLVANIA, A CORPORATION OF NEW JERSEY.

GLASS-DRAWING POT.

1,207,659.

Specification of Letters Patent.

Patented Dec. 5, 1916.

Application filed July 30, 1915. Serial No. 42,751.

*To all whom it may concern:*

Be it known that I, JOHN A. SWEET, a citizen of the United States, residing at New Kensington, Westmoreland county, State of Pennsylvania, have invented a new and useful Improvement in Glass-Drawing Pots, of which the following is a full, clear, and exact description, reference being had to the accompanying drawing, forming part of this specification, in which the figure is a transverse vertical section of a reversible double-cavity glass-drawing pot embodying my invention.

The invention has relation to glass drawing pots, and more particularly to pots of the tipping or invertible type, and which are mounted in such a manner that they can be inverted after a drawing operation for the purpose of applying heat thereto to melt and drain out the residue of glass left from such operation. The proper draining of these pots has been a matter of some difficulty, since with a flat-bottomed pot, drained in an inverted substantially horizontal position, when the residue of glass is nearly all drained out, small bubbles or knobs of glass will still adhere to the bottom of the cavity. When the cavity is used for the next draw, these bubbles form blisters or other defects in the drawn articles.

I have discovered that the drainage of the pots can be greatly improved and the remaining bubbles or globules largely eliminated by sloping the bottom from a central apex and the side wall toward an annular depression. When made in this form and the pot is inverted, the glass will drain in approximately radial lines toward the center, and the side wall away from the drawing zone; and during the latter part of the draining will drop from this central portion and the side wall. The bubbles or globules which remain will, therefore, be confined to the portions beyond the drawing zone of the pot.

Another object of my invention is to provide a pot in which the bottom is so shaped that the thinnest portion thereof, which is the hottest, is normally in a different vertical plane from the drawing zone, which will cause the cylinder being drawn to move laterally relative thereto, and thereby avoid drawing cylinders having thick and thin portions.

In the accompanying drawing, I have illustrated my invention as applied to a reversible double cavity pot of the well known Thornburg type, although it is applicable to any invertible pot having one or more drawing cavities or receptacles. In this drawing, 2 designates the body of the pot, having opposite pot cavities, 3 the trunnions on which the pot is supported and turned in the usual manner, and 4 the kiln for heating the pot when drawing from the upper cavity while melting and draining the metal from the lower cavity. The wall 5 of the pot body between the two cavities is made of gradually decreasing thickness from its center toward the annular depression 6 and gradually increasing in thickness from the recesses toward the side walls, as shown at 7, thereby forming the approximately cone-shaped bottom walls at the central portions, so that drainage is made in the manner above described.

In practice, I prefer to place the annular depression 6 within the drawing zone of the cylinder, and as the hottest portion of the glass in the pot is above the thinnest portion of the bottom, it follows that if, for any cause, a cylinder which is being formed tends to become thin on one side, the pressure of air within pushes the thin side laterally toward the colder and thicker glass in the pot, while the opposite and thicker side is drawn toward the hotter and thinner glass over the depression, and thereby the tendency toward thick and thin formation is automatically corrected.

The advantages of my invention result from the provision of a pot having radially sloping surfaces to cause the metal to drain away from the drawing zone when the residue of glass is melted out of the pot, and which sloping surfaces will form a bottom having an annular thin portion which will be heated to a higher temperature than other portions of the bottom to cause the cylinder being drawn to automatically move with relation thereto, thereby causing the glass to flow equally to all portions of the cylinder.

While I prefer to make nearly a true cone surface at the center with a relatively sharp apex in order to concentrate the drainage discharge as near the center of the pot as possible, this center portion may be somewhat rounded or flattened. The surfaces leading away from the depression should be inclined planes and not appreciably curved in either convex or concave form, since such curvature will tend to defeat the purpose of my invention.

I claim:

1. An invertible glass drawing pot, having a central cone portion on the bottom of its pot cavity, the inclined surfaces of the cone being without any substantial curvature in the direction of their inclination, substantially as described.

2. An invertible glass drawing pot having a pot cavity whose bottom wall is inclined downwardly in all directions from its center and also in all directions from the base of its outer wall, the inclined surfaces of said bottom wall being without substantial curvature in the direction of their slope, substantially as described.

3. An invertible glass drawing pot having a pot cavity whose bottom wall is inclined downwardly in all directions from its center and also in all directions from the base of its outer wall, the two inclined surfaces meeting each other without curvature at an abrupt obtuse angle, substantially as described.

4. An invertible glass drawing pot having a pot cavity whose bottom wall is inclined downwardly in all directions from its center and also in all directions from the base of its outer wall, the inclined surfaces of said bottom wall being without substantial curvature in the direction of their slope, and the bottom of the pot being thinnest at the annular zone where the two inclined surfaces meet each other, substantially as described.

5. A reversible glass drawing pot, having two opposite pot cavities with a common bottom wall, each of said cavities having its bottom wall inclined downwardly in all directions from the center and also inclined downwardly in all directions from the sides, the inclined surfaces being substantially free from curvature in the direction of their slope, substantially as described.

In testimony whereof, I have hereunto set my hand.

JOHN A. SWEET.

Witnesses:
H. M. CORWIN,
JESSE B. HELLER.